US008606882B2

(12) United States Patent
Kaida

(10) Patent No.: US 8,606,882 B2
(45) Date of Patent: Dec. 10, 2013

(54) COMMUNICATION TERMINAL, COMMUNICATION METHOD, AND RECORDING MEDIUM

(75) Inventor: Sou Kaida, Tokyo (JP)

(73) Assignee: NEC Corporation, Tokyo (JP)

( * ) Notice: Subject to any disclaimer, the term of this patent is extended or adjusted under 35 U.S.C. 154(b) by 391 days.

(21) Appl. No.: 12/812,138

(22) PCT Filed: Feb. 5, 2009

(86) PCT No.: PCT/JP2009/052349
§ 371 (c)(1),
(2), (4) Date: Jul. 8, 2010

(87) PCT Pub. No.: WO2009/101994
PCT Pub. Date: Aug. 20, 2009

(65) Prior Publication Data
US 2010/0293253 A1 Nov. 18, 2010

(30) Foreign Application Priority Data
Feb. 14, 2008 (JP) .................... 2008-033223

(51) Int. Cl.
*G06F 15/16* (2006.01)
(52) U.S. Cl.
USPC ....................................... 709/219
(58) Field of Classification Search
USPC ................. 709/217–218, 249–250
See application file for complete search history.

(56) References Cited

U.S. PATENT DOCUMENTS

| 7,664,864 B2 * | 2/2010 | Ball et al. ................ 709/229 |
| 2004/0039820 A1 * | 2/2004 | Colby et al. ............... 709/226 |
| 2007/0171881 A1 * | 7/2007 | Zhang et al. ............... 370/338 |
| 2007/0260691 A1 * | 11/2007 | Kallqvist et al. ............ 709/206 |
| 2008/0016177 A1 * | 1/2008 | Jin et al. .................... 709/217 |
| 2008/0124046 A1 * | 5/2008 | Hiramatsu et al. ............ 386/95 |
| 2009/0024626 A1 * | 1/2009 | Takei ........................... 707/9 |
| 2009/0144390 A1 * | 6/2009 | Previdi et al. ............... 709/217 |
| 2010/0022241 A1 * | 1/2010 | Hokao ...................... 455/435.2 |

FOREIGN PATENT DOCUMENTS

| JP | 2004062342 A | 2/2004 |
| JP | 2004336256 A | 11/2004 |
| JP | 2006155506 A | 6/2006 |
| JP | 2006210993 A | 8/2006 |
| JP | 2007034810 A | 2/2007 |
| WO | 2007063901 A | 6/2007 |

OTHER PUBLICATIONS

International Search Report for PCT/JP2009/052349 mailed May 19, 2009.

* cited by examiner

*Primary Examiner* — Abdullahi Salad

(57) ABSTRACT

Provided is a communication terminal which can be connected to a plurality of types of network and switching to a network appropriate for a content to be handled can be performed without forcing a user to perform the switching to a connection destination. It is also possible to provide a communication method using the communication terminal, a program, and a recording medium. The communication terminal transmits a content transmission request to an external server and receives a response to the content transmission request from the external server. The communication terminal extracts content information from the received response, selects at least one network in accordance with the extracted content information, and makes a connection to the selected network.

12 Claims, 6 Drawing Sheets

COMMUNICATION TERMINAL, COMMUNICATION METHOD, AND RECORDING MEDIUM

This application is the National Phase of PCT/JP2009/052349, filed Feb. 5, 2009, which claims priority based on Japanese application Japanese Patent Application No. 2008-033223 filed on Feb. 14, 2008 and the disclosure thereof is incorporated herein in its entirety.

TECHNICAL FIELD

The present invention relates to a communication terminal which can be connected with a plurality of types of networks; and a communication method using the communication terminal, a program and a recording medium; and in particular, relates to a communication terminal; and a communication method using the communication terminal, a program and a recording medium; which are desirably applied in case a communication terminal connectable both with a mobile telephone network and a wireless LAN performs data communication of a large capacity file with particular contents.

BACKGROUND ART

In recent years, a mobile phone which is equipped with wireless LAN (Local Area Network) function begins to appear on the market. A mobile phone which is equipped with wireless LAN function can be connected with a mobile telephone network such as an IMT (International Mobile Telecommunication)-2000 network and a wireless LAN.

Here, in data communication via an IMT-2000 network, in order that traffic of a network will not become full, the upper limit of a file size allowable for data communication is decided. Accordingly, a user cannot download a large capacity file with a file size exceeding the upper limit. Further, when sending or receiving a file of particular contents with a relatively large capacity, the communication speed of data communication via an IMT-2000 network is slower than the communication speed of data communication via a wireless LAN, and efficiencies are low.

In Japanese Patent Application Laid-Open No. 2004-336256, a data communication system which changes a bearer in such a case when the fall of the radio field intensity during data communication with a server device such as a contents server is detected is disclosed. In the data communication system, a terminal device and a mobile terminal are connected with a TCP (Transmission Control Protocol)/IP (Internet Protocol) network respectively. In this state, the terminal device downloads contents from a contents server via a mobile terminal, an IMT-200 network and a TCP/IP network. Then, when a fall of the radio field intensity is detected during downloading, the mobile terminal disconnects the connection with the IMT-200 network. At that time, because a connection of the terminal device and the TCP/IP network is continued, communication between the contents server and the TCP/IP network is maintained. So, contents transmitted to the TCP/IP network from the contents server are stored in a proxy server until the mobile terminal establishes communication newly. Contents stored in the proxy server are downloaded to the terminal device via the wireless LAN and the mobile terminal, when the mobile terminal establishes communication with a wireless LAN.

Also in Japanese Patent Application Laid-Open No. 2006-155506, a contents supply method which provides contents considering the types of bearers that a mobile terminal uses is disclosed. In the contents supply method, when a server receives a transmission request of contents from a mobile terminal, contents suitable for the bearer are selected based on the bearer's information used by the transmission request of contents. Then, for the transmission request of contents, selected contents are transmitted to the mobile terminal. Accordingly, by applying the contents supply method, it is possible to transmit contents suitable for a bearer.

DISCLOSURE OF THE INVENTION

Problem to be Solved by the Invention

A data communication system disclosed in Japanese Patent Application Laid-Open No. 2004-336256 changes a bearer based on the strength or the like of the radio field intensity. However, in the data communication system, the bearer cannot be changed depending on the type or the size of the contents to be handled.

In a contents supply method disclosed in Japanese Patent Application Laid-Open No. 2006-155506, a server device selects contents suitable for the bearer which is used by the transmission request of contents. However, in the contents supply method, a user needs to change to a bearer fitted for the contents to be handled, and perform a transmission request of contents to a server using the changed bearer, thus an unnecessary burden is imposed upon the user.

An object of the present invention is to provide; a communication terminal which can be connected with a plurality of types of networks; a communication terminal which can connect with a network suitable for the contents to be handled without imposing a burden upon a user such as changing a network to be connected; and a communication method using the communication terminal, a program and a recording medium.

Means for Solving the Problem

In order to achieve the above-mentioned object, a communication terminal of the present invention can be connected with a plurality of types of networks. The communication terminal includes a communication means which transmits a transmission request of contents to an external server and receives a response to the transmission request of contents from the external server, an extraction means to extract content information from the received response and a control means which selects at least one network based on the extracted content information and makes the communication means connect with the selected network.

Further, in order to achieve the above-mentioned object, a communication method of the present invention is a communication method using a communication terminal which can be connected with a plurality of types of networks. The communication method comprises transmitting a transmission request of contents to an external server, receiving a response to the transmission request of contents from the external server, extracting content information from the received response, selecting at least one network based on the extracted content information and connecting with the selected network.

Further, in order to achieve the above-mentioned object, a program of the present invention is a program which controls a communication terminal which can be connected with a plurality of types of networks. The program makes a computer execute a procedure to transmit a transmission request of contents to an external server, a procedure to receive a response to the transmission request of contents, a procedure to extract content information from the received response, a procedure to select at least one network based on the extracted content information and a procedure to connect with the selected network.

Further, in order to achieve the above-mentioned object, a recording medium of the present invention is a recording medium which records a program that makes a computer control a communication method with an external server for a communication terminal which can be connected with a plurality of types of networks, and which a computer can read. The storage medium is recorded a program which makes a computer execute a procedure to transmit a transmission request of contents to an external server, a procedure to receive a response to the transmission request of the contents, a procedure to extract content information from the received response, a procedure to select at least one network based on the extracted content information and a procedure to connect with the selected network.

The Effect of the Invention

In a communication terminal concerning the present invention, a communication method using the communication terminal, a program and a recording medium, a communication terminal which can connect with a plurality of types of networks can connect with a suitable network for the contents to be handled without imposing a burden upon a user such as changing a network to be connected.

BRIEF DESCRIPTION OF DRAWINGS

The object mentioned above, and other objects, features and advantages become clearer by the preferred embodiment described below and accompanying drawings below.

Figure 1:
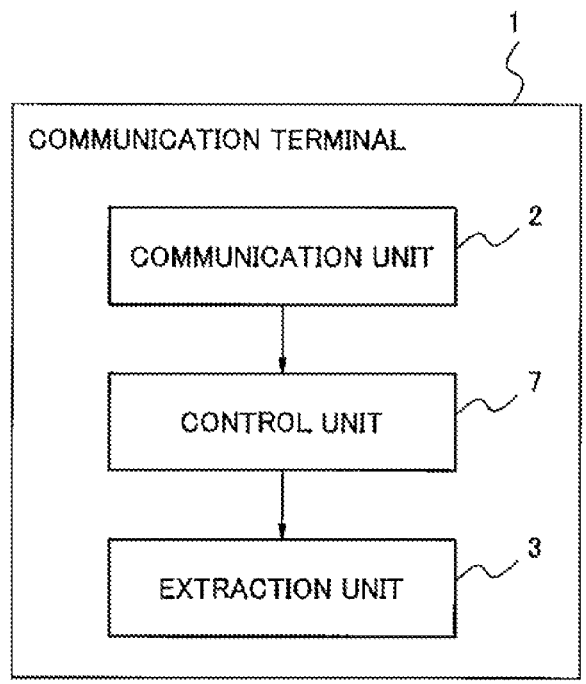
FIG. 1 An example of a block diagram of a communication terminal 1 according to the exemplary embodiment.

REFERENCE SIGNS LIST 1, 1a Communication terminal
2, 2a Communication unit
3, 3a Extraction unit
4 Low speed network
5 High speed network
6 External server
7, 7a, 11 Control unit
10, 10a, 10b, 10c Mobile phone
12 Memory
13 IMT-2000 communication unit
14 Wireless LAN communication unit
15 Display
16 Operation unit
17 Top case
18 Bottom case
19 Hinge
20 IMT-2000 network
21 Third server
22 First antenna
30 Wireless LAN
31 Fourth server
32 Second antenna
40 Internet
41 First server
42 Second server
51 First gateway
52 Second gateway
60 Mobile terminal
61 Network switching means
62 Contents acquisition means

BEST MODE FOR CARRYING OUT THE INVENTION

An exemplary embodiment of the present invention is described in detail. FIG. 1 is a block diagram showing a communication terminal 1 of the first exemplary embodiment of the present invention. In FIG. 1, a communication terminal 1 includes a communication unit 2, an extraction unit 3 and a control unit 7.

A communication unit 2 can be connected with a plurality of networks. Further, a communication unit 2 performs data communication with an external server directly or via a network. In this exemplary embodiment, in order to receive contents from an external server, a communication unit 2 transmits to an external server a transmission request of contents. Then, when a response to the transmission request of contents is received from an external server, the response is transmitted to an extraction unit 3.

When an extraction unit 3 receives the response from a communication unit 2, the extraction unit 3 extracts content information from an HTTP (Hypertext Transfer Protocol) header of the response and sends it to a control unit 7.

A control unit 7 selects at least one network based on content information received from an extraction unit 3. Further, a control unit 7 controls a communication unit 2, and makes it connect with the selected network.

By so doing, when handling contents, a communication terminal 1 can connect with a suitable network for contents which a communication terminal 1 handles, without imposing a burden upon a user for changing a network to be connected.

Figure 2:
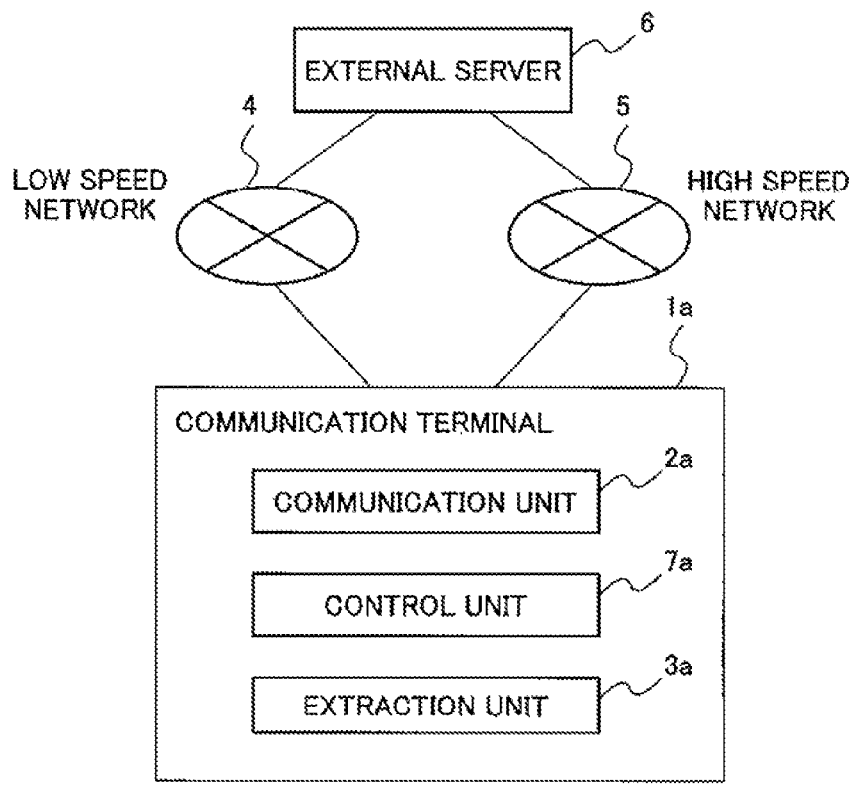
FIG. 2 An example of a block diagram of a network to which a communication terminal 1a according to the exemplary embodiment relates.

Next, as a second exemplary embodiment of the present invention, a communication terminal 1a which can communicate with an external server via a low speed network or a high speed network is described. FIG. 2 is an example of a block diagram of a network to which the communication terminal 1a according to this exemplary embodiment relates. As shown in FIG. 2, the communication terminal 1a performs data communication with an external server 6 via a low speed network 4 or a high speed network 5.

The communication terminal 1a includes a communication unit 2a, an extraction unit 3a and a control unit 7a. Each of the communication unit 2a, the extraction unit 3a and the control unit 7a includes function almost similar to that of each of the communication unit 2, the extraction unit 3 and the control unit 7 which are described in the above-mentioned exemplary embodiment. Further, according to this exemplary embodiment, the communication unit 2a connects with the low speed network 4 or the high speed network 5 and performs data communication with the external server 6 via the connected network. Further, the extraction unit 3a extracts a content type value and a content size value as content information from an HTTP header of a response received from the external server 6. Here, the content type value is a value representing a kind or a type of contents, and the content size value is a value representing a file size of contents. A control unit 7a selects either the low speed network 4 or the high speed network 5 based on the extracted content type value and the content size value.

In this exemplary embodiment, when contents are received from the external server 6 using the communication terminal 1a, first, the communication unit 2a transmits a transmission request of contents to the external server 6. And when a response to the transmission request of contents is received from the external server 6, the communication unit 2a transmits the response to the extraction unit 3a.

When the response is received from the communication unit 2a, the extraction unit 3a extracts a content type value and a content size value from the HTTP header of the received response, and transmits them to the control unit 7a.

The control unit 7a selects either the low speed network 4 or the high speed network 5 based on the received content type value and the content size value. Further, the control unit 7a controls the communication unit 2a, and makes it connect with the selected network. The communication unit 2a receives contents from the external server 6 via the selected and connected network.

Then, when a reception of the contents is completed, the control unit 7a controls the communication unit 2a, and ends a connection with the selected network.

For example, when the high speed network 5 is selected in a state when the communication terminal 1a is performing data communication via the low speed network 4, the control unit 7a disconnects a connection with the low speed network 4 and connects with the high speed network 5. Further, when the reception of the contents via the high-speed network 5 is completed, the control unit 7a ends the connection with the high-speed network 5. That is, the connection with the high-speed network 5 is disconnected, and the low speed network 4 is connected once again.

According to this exemplary embodiment, the communication terminal 1a extracts the content type value and the content size value from the response to a transmission request of contents transmitted to the external server 6, and based on these, selects and connects with a suitable network for contents. Because the communication terminal 1a connects automatically with a suitable network for contents, a special burden will not be imposed upon a user who operates the communication terminal 1a. Also by receiving the contents via the suitable network for contents, contents can be received efficiently.

Here, as the low speed network 4, the third generation mobile telephone network such as an IMT-2000, for example, and as the high speed network 5, a wireless LAN, for example, can be applied. In this case, as the communication terminal 1a changes a connection to a wireless LAN automatically, it becomes possible to receive a file whose size is larger than the file size restricted by an IMT-2000 network or the like. Further, when a file of specific contents with a relatively large capacity is received, because of switching over to the wireless LAN automatically which is faster in communication speed than the IMT-2000 network, it is efficient. Further, by downloading specific contents with large file size via the wireless LAN, traffic of a carrier network such as the IMT-2000 network can be reduced. In the mean time, the user can suppress the communication charge.

Next, as a third exemplary embodiment of the present invention, a communication terminal which stores first and second threshold values and selects a network using the threshold value is described. According to this exemplary embodiment a mobile phone is applied as a communication terminal.

Figure 3:
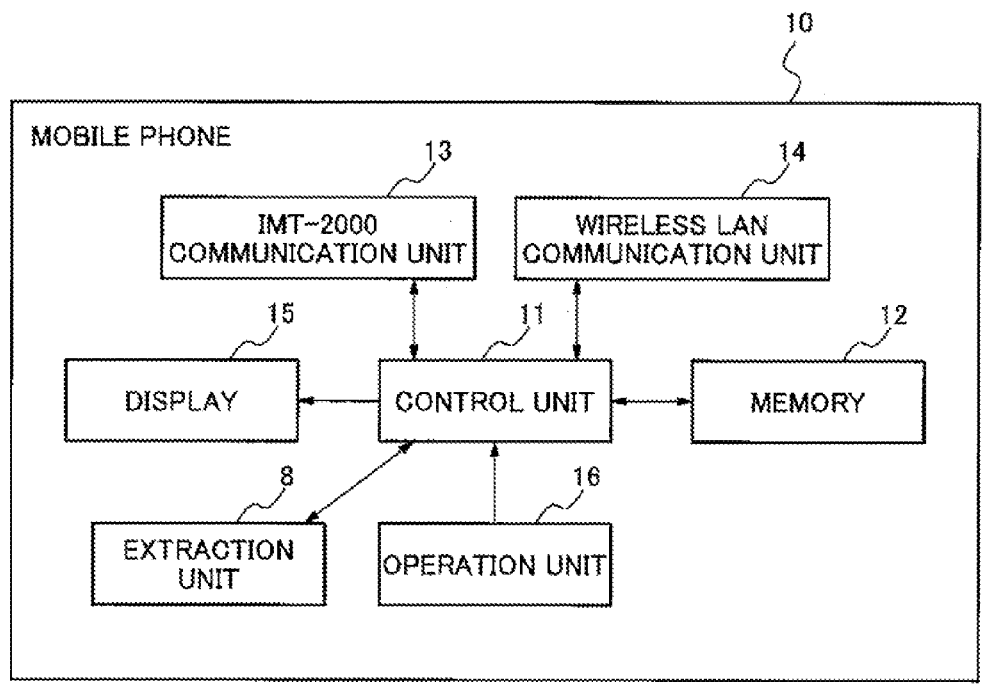
FIG. 3 An example of a block diagram of a mobile phone 10 according to the exemplary embodiment.

FIG. 3 is a block diagram which indicates an internal configuration of a mobile phone 10 of this exemplary embodiment. As shown in FIG. 3, the mobile phone 10 includes a control unit 11, a memory 12 which stores various data, an IMT-2000 communication unit 13, a wireless LAN communication unit 14, a display 15, an operation unit 16 which accepts input to the mobile phone 10 from a user and an extraction unit 8 which extracts a content type value and a content size value from an HTTP header of a response received from a server.

According to this exemplary embodiment, a Media Type value (such as video/3gpp, audio/3gpp) of contents acquired via a wireless LAN and a file size threshold value Lmax (such as 500,000 [byte]) for each Media Type are stored in the memory 12 in advance. The first threshold value corresponds to the Media Type value, and the second threshold value corresponds to the threshold value Lmax.

Figure 4:
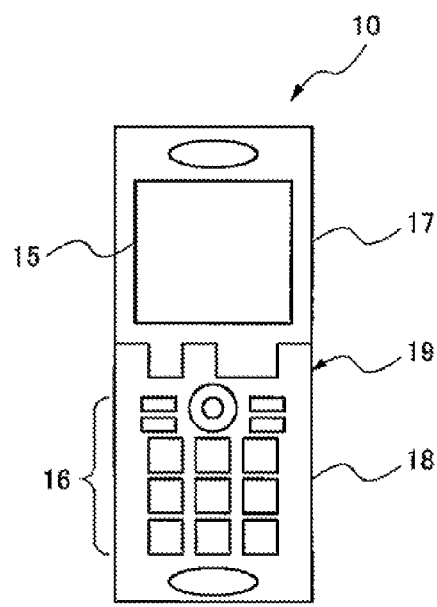
FIG. 4 An example of an external view of a mobile phone 10 according to the exemplary embodiment.

FIG. 4 is a figure which indicates an example of an external view of the mobile phone 10 of this exemplary embodiment. In FIG. 4, the mobile phone 10 of this exemplary embodiment is a folder type mobile phone in which a top case 17 which mounts a display 15 and a bottom case 18 which mounts an operation unit 16 are connected by a hinge 19. Of course, those which adopt sliding structure or so-called candy bar structure that holds a display and an operation unit in a single case are also acceptable.

Figure 5:
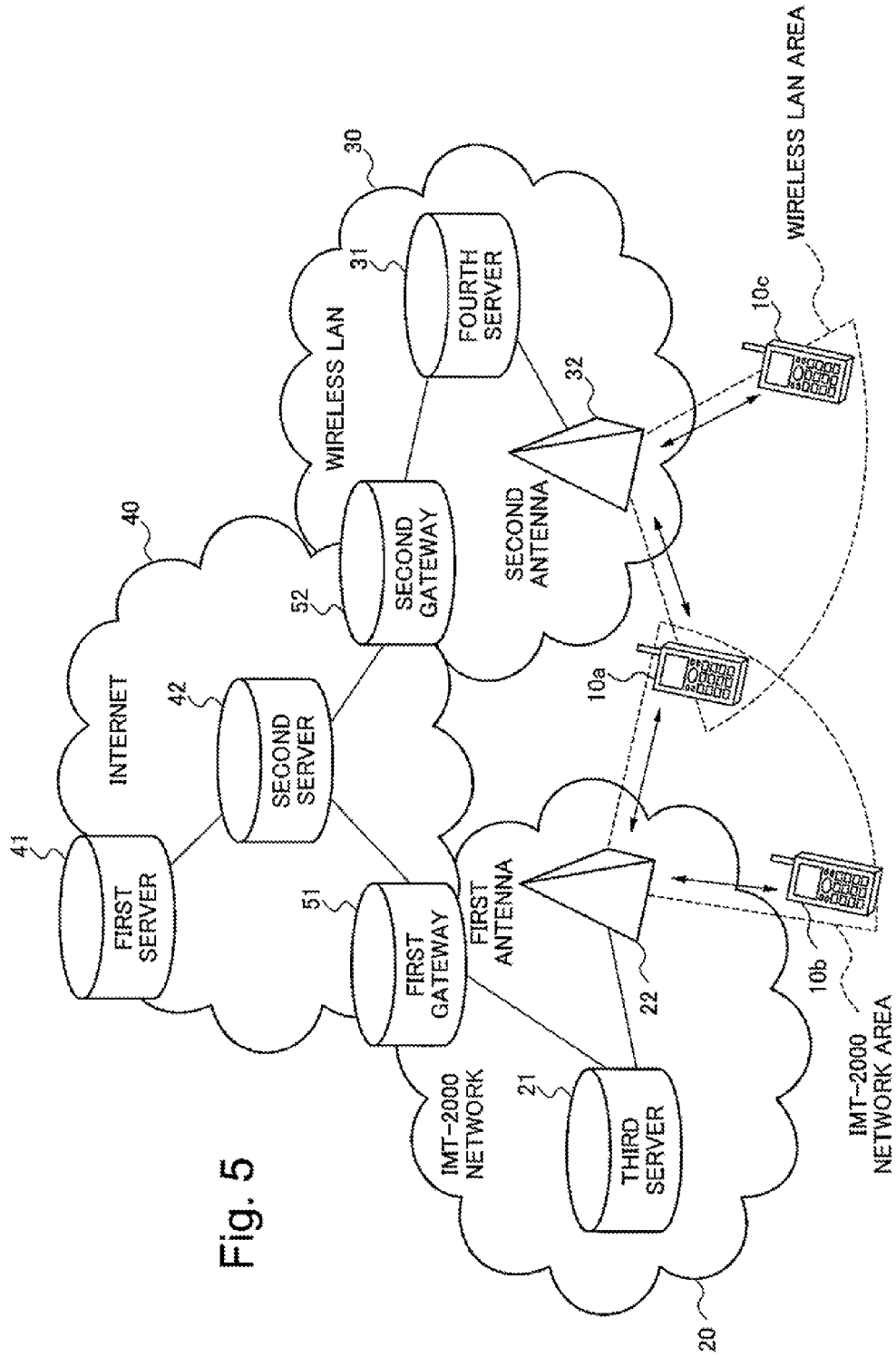
FIG. 5 An example of a block diagram of a network to which a mobile phone 10 according to the exemplary embodiment relates.

Next, a network configuration to which the mobile phone 10 of this exemplary embodiment relates is described. FIG. 5 is a conceptual drawing of a network to which the mobile phone 10 of this exemplary embodiment relates. In FIG. 5, the network includes mainly an IMT-2000 network 20, a wireless LAN 30 and the internet 40.

The IMT-2000 network 20 includes a third server 21 and a first antenna 22. The third server 21 performs data communication with a second server 42 on the internet 40 via a first gateway 51. Here, the first gateway 51 is an inter-LAN connection device which connects the internet 40 and the IMT-2000 network 20. By sending and receiving radio wave, the first antenna 22 performs data communication between the third server 21 and the mobile phone 10 which are in a position of a mobile phone 10a or a mobile phone 10b.

The wireless LAN 30 includes a fourth server 31 and a second antenna 32. The fourth server 31 performs data communication with the second server 42 on the internet 40 via a second gateway 52. Here, the second gateway 52 is an inter-LAN connection device which connects the internet 40 and the wireless LAN 30. By sending and receiving radio wave, the second antenna 32 performs data communication between the fourth server 31 and the mobile phone 10 which are in a position of a mobile phone 10a or a mobile phone 10c.

The internet 40 includes a first server 41 that provides contents and a second server 42 that relays contents from the first server 41.

Further, the mobile phone 10 shown in FIG. 3 is, when it is in a position of the mobile phone 10a or the mobile phone 10b shown in FIG. 5, within the range of the IMT-2000 network 20 and can connect with the IMT-2000 network 20. Further, the mobile phone 10 is, when it is in a position of the mobile phone 10a or the mobile phone 10c, within the range of the wireless LAN 30 and can connect with the wireless LAN 30. Hereinafter, the mobile phone 10 in a position of the mobile phone 10a is described as the mobile phone 10a, so is the mobile phone 10 in a position of the mobile phone 10b as the mobile phone 10b and the mobile phone 10 in a position of the mobile phone 10c as the mobile phone 10c.

Figure 6:
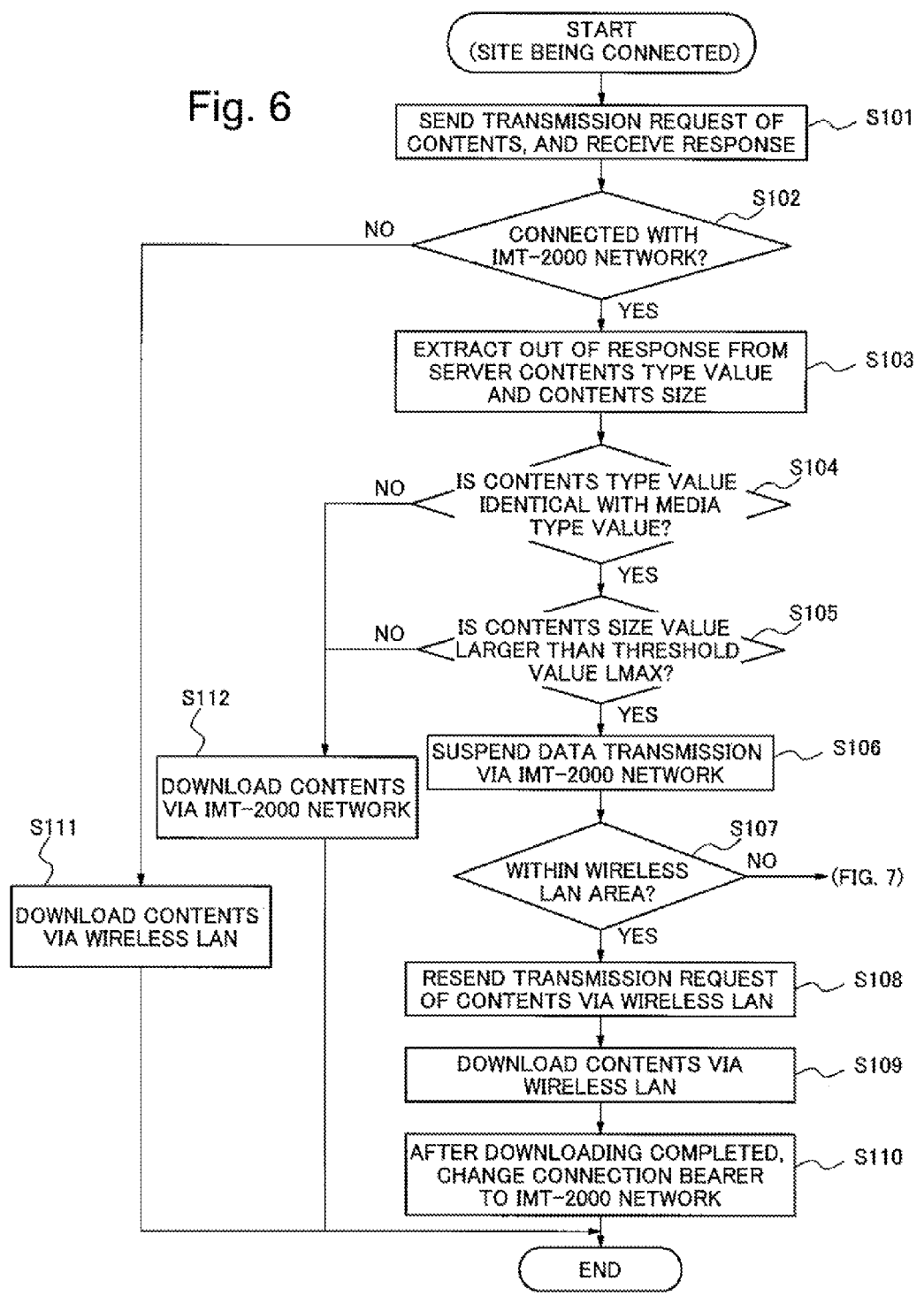
FIG. 6 A flow chart showing a communication change operation of a mobile phone 10 according to the exemplary embodiment.

Next, with reference to FIG. 3, FIG. 5 and FIG. 6, an operation flow which the mobile phone 10 of this exemplary embodiment performs is described. FIG. 6 is a flow chart showing an operation in which the mobile phone 10 of this exemplary embodiment connects with a suitable network for contents automatically at the starting time of downloading contents.

The mobile phone 10 is in a position of the mobile phone 10a shown in FIG. 5 and connects with the first server 41 via the IMT-2000 network 20 using the IMT-2000 communication unit 13.

When a user directs to download contents using the operation unit 16 in this state, the control unit 11 controls the IMT-2000 communication unit 13, sends a transmission request of contents to the first server 41 via the IMT-2000 network 20 and receives the response to the transmission request of contents from the first server 41 (Step S101). When the response is received, the control unit 11 judges whether data communication using the IMT-2000 communication unit 13 is being performed or not (Step S102). And when data communication using the IMT-2000 communication unit 13 is being performed (Step S102/YES), the received response is transmitted to the extraction unit 8. Further, the control unit 11 receives from the extraction unit 8 a content type value and a content size value which the extraction unit 8 extracted from an HTTP header of the response (Step S103).

When the received the content type value is identical to the Media Type value stored in the memory 12 (Step S104/YES) and the received content size value is larger than the threshold value Lmax stored in the memory 12 (Step S105/YES), the control unit 11 suspends data communication using the IMT-2000 communication unit 13 (Step S106).

Further, the control unit 11 judges whether the mobile phone 10a is within the range of the wireless LAN 30 or not (Step S107). And when it is within the range of the wireless LAN 30 (Step S107/YES), the communication unit used for data communication is changed from an IMT-2000 communication unit 13 to the wireless LAN communication unit 14. After that, the control unit 11 resends the transmission request of contents to the first server 41 via the wireless LAN 30 using the wireless LAN communication unit 14 (Step S108).

By the first server 41's receiving a transmission request of contents, downloading of contents from the first server 41 to the mobile phone 10a via the wireless LAN 30 is started (Step S109). After downloading is completed, the control unit 11 returns the communication unit used for data communication from the wireless LAN communication unit 14 to the IMT-2000 communication unit 13 (Step S110).

Here, in Step S102, when data communication via the wireless LAN 30 using the wireless LAN communication unit 14 is being performed (Step S102/NO), downloading of contents continues to be performed as before via the wireless LAN 30 (Step S111).

Also in Step S104, when the extracted content type value is not identical to a Media Type value stored in the memory 12 (Step S104/NO), change of the wireless LAN communication unit 14 is not performed, and downloading of contents continues to be performed as before via an IMT-2000 network 20 (Step S112). Similarly, in Step S105, when the extracted content size value is smaller than the threshold value Lmax stored in the memory 12 (Step S105/NO), change of the wireless LAN communication unit 14 is not performed, and downloading of contents continues to be performed as before via the IMT-2000 network 20 (Step S112).

Further, in Step S107, a case when the mobile phone 10 is not within the range of the wireless LAN 30, that is, when it is in a position of the mobile phone 10b of FIG. 5 or the like, is described later.

According to the exemplary embodiment mentioned above, when contents are downloaded, the mobile phone 10 selects and connects a suitable network for the contents by extracting a content type value and a content size value of an HTTP header included in the response from a server corresponding to a transmission request of contents, and by comparing an extracted content type value and a content size value with a Media Type value and a threshold value Lmax stored in a memory 12.

By the mobile phone 10's selecting the suitable network for contents and connecting automatically, contents can be downloaded via the suitable network for the contents without imposing a burden on a user who operates the mobile phone 10. Further, when the Media Type value and a file size threshold value Lmax are stored in advance in the memory 12 as threshold values, and the control unit 11 compares the Media Type value and the threshold value Lmax with the extracted content type value and the content size value, and selects a network, processing of the control unit 11 can be made simply.

Here, in Step S106 of FIG. 6, the mobile phone 10 can show on the display 15 a message about suspending data communication via the IMT-2000 network 20 and changing to data communication via the wireless LAN 30. Further, by letting a user select in the message whether to change to data communication via the wireless LAN 30 or not, and in case changing to data communication via the wireless LAN 30 is selected by using the operation unit 16, the user can perform the change.

Figure 7:
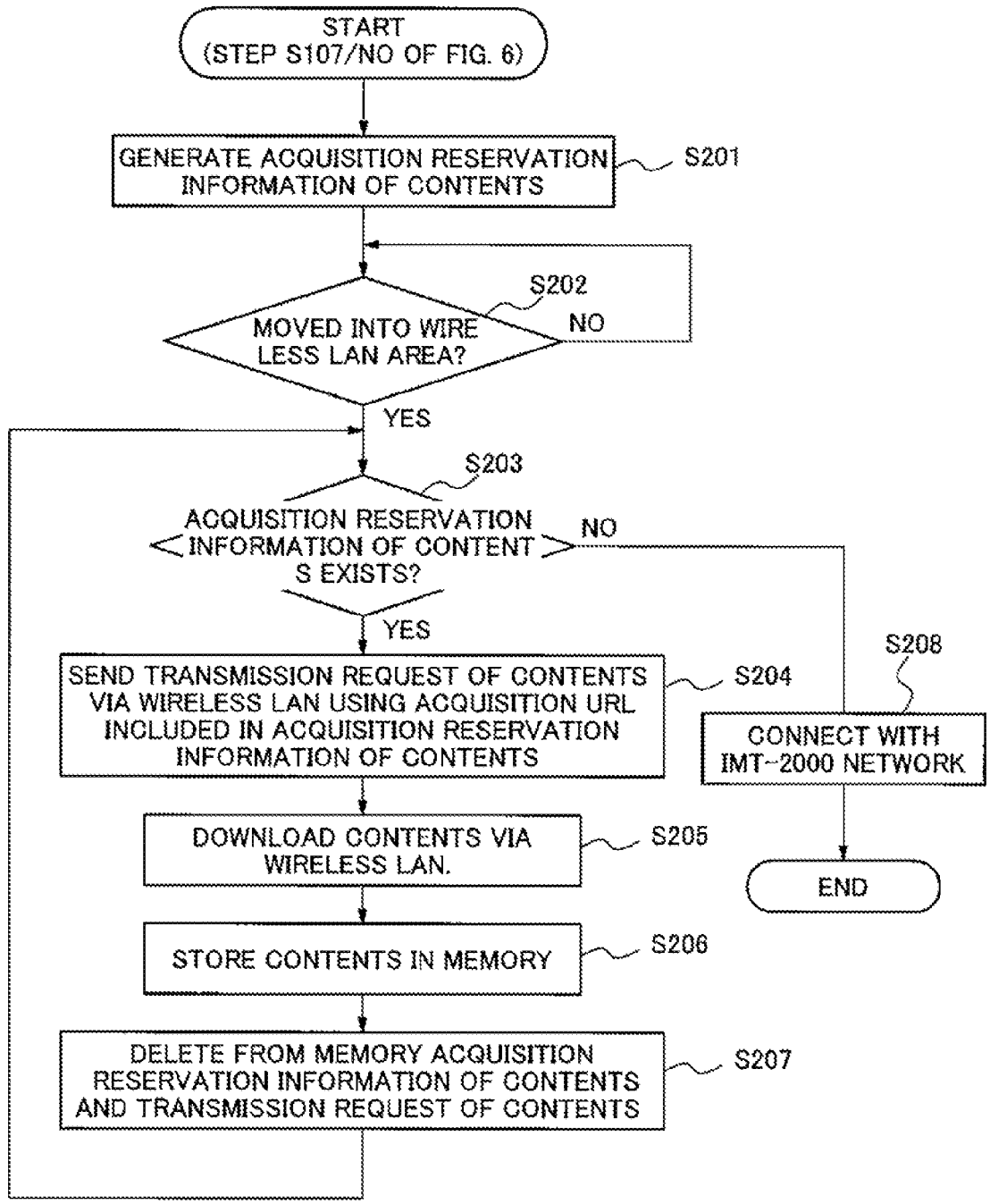
FIG. 7 A flow chart showing an acquisition reservation operation of contents by a mobile phone 10 according to the exemplary embodiment.

Next, in Step S107 of FIG. 6, an operation flow of the mobile phone 10 when the mobile phone 10 is not within the range of the wireless LAN 30, is described using FIG. 7.

When the mobile phone 10 is not within the range of the wireless LAN 30, the control unit 11 generates acquisition reservation information of contents. The control unit 11 correlates generated acquisition reservation information of contents with a transmission request of contents used in Step S101 of FIG. 6, and stores it in the memory 12 (Step S201). According to this exemplary embodiment, acquisition URL (Uniform Resource Locator) information of contents is included in acquisition reservation information of contents.

After that, when the mobile phone 10 moves from out of the range to within the range of the wireless LAN 30 (Step S202/YES), the control unit 11 judges whether acquisition reservation information of contents is stored in the memory 12 (Step S203). In this exemplary embodiment, the mobile phone 10 moves from a position of the mobile phone 10b to a position of the mobile phone 10c.

When acquisition reservation information of contents is stored in the memory 12 of the mobile phone 10c (Step S203/YES), the control unit 11 switches a communication unit used for data communication from the IMT-2000 communication unit 13 to the wireless LAN communication unit 14. Further, the control unit 11 connects with acquisition URL included in acquisition reservation information of contents via the wireless LAN 30, and sends a transmission request of contents stored in the memory 12 corresponding to the acquisition reservation information of contents to acquisition URL (Step S204). In this exemplary embodiment, acquisition URL indicates URL of the first server 41. In other words, the control unit 11 resends a transmission request of contents to the first server 41 via the wireless LAN 30.

After that, the control unit 11 of a mobile phone 10c downloads contents transmitted from the first server 41 via the wireless LAN 30 (Step S205), and stores it in the memory 12 (Step S206). Then, the control unit 11 deletes from the memory 12 acquisition reservation information of contents and a transmission request of contents for contents whose downloading is completed (Step S207).

Further, returning to Step S203, the control unit 11 judges whether other acquisition reservation information of contents does not exist in the memory 12. When other acquisition reservation information of contents remains (Step S203/YES), Steps S204 to S207 are repeated until acquisition reservation information of contents is all deleted. On the other hand, when other acquisition reservation information of contents does not exist (Step S203/NO), the communication unit used for data communication is set to the IMT-2000 communication unit 13 (Step S208), and the process ends.

According to this exemplary embodiment mentioned above, for contents which could not be downloaded via the wireless LAN 30, acquisition reservation of contents is performed, and when the mobile phone 10 moves into the range of the wireless LAN 30, the mobile phone 10 downloads contents automatically. Accordingly, when the mobile phone 10 moves into the range of the wireless LAN 30, a user does not need to direct the mobile phone 10 again concerning directions to download contents which was performed once before.

Here, at the time of acquisition reservation of contents, it is desirable to secure in the memory 12 as a reserved space the capacity of the file size confirmed from a content size value. Further, when the free space of a memory 12 is confirmed and the file size acquired as a content size value is larger than the confirmed free space, the control unit 11 may not store acquisition reservation information of contents in the memory 12, and can notify a user by using the display 15 or the like.

Next, a fourth exemplary embodiment of the present invention is described. According to this exemplary embodiment a mobile terminal 60 is applied as a communication terminal. The mobile terminal 60 according to this exemplary embodiment is equipped with the function to communicate with an external server 6 by connecting with a plurality of types of networks including a low speed network and a high speed network. The mobile terminal 60 includes a network switching unit 61 which changes a network to connect temporarily based on a content type value representing a type of the contents from among the data included in an HTTP header in a response from the external server 6 and based on a content size value representing a file size of the contents from among the data included in the HTTP header, and a contents acquisition unit 62 which acquires contents from the external server 6 via the connected network.

Figure 8:
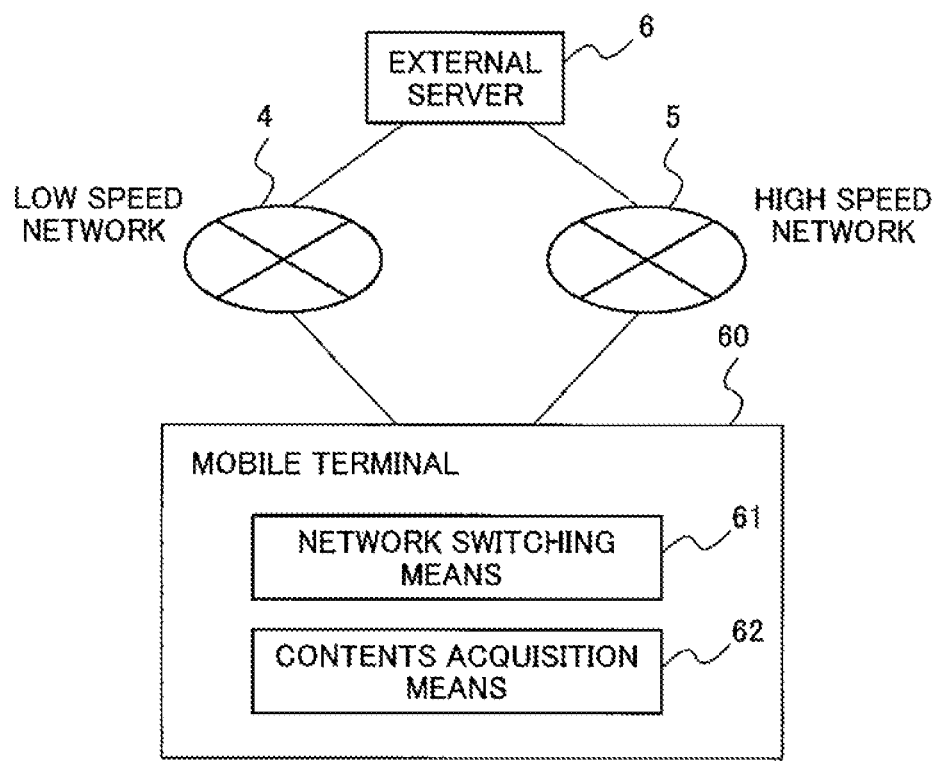
FIG. 8 An example of a block diagram of a network to which a mobile terminal 60 according to the exemplary embodiment relates.

FIG. 8 is a conceptual drawing of a network to which the mobile terminal 60 of this exemplary embodiment relates. In FIG. 8, the mobile terminal 60 is a device which performs data communication by a plurality of communication methods and acquires contents from the external server 6 by connecting with a low speed network 4 or a high speed network 5, for example. Then, the mobile terminal 60 includes the network switching means 61 and the contents acquisition means 62. A network switching means 61 corresponds to a communication unit and an extraction unit in the exemplary embodiments mentioned above, and changes a network to connect temporarily based on a content type value representing a type of the contents from among the data included in an HTTP header in a response from the external server 6 and based on a content size value representing a file size of the contents from among the data included in an HTTP header. After performing an acquisition request of contents, the contents acquisition means 62 acquires contents which relates to the request from the external server 6 via the connected network.

The mobile terminal 60 may be composed further to include a threshold value storage means storing a first threshold value that represents a type of the contents to be acquired by connecting with the high speed network 5 and a second threshold value that represents a file size of the contents to be acquired from the high speed network 5. In this case, when the content type value and the first threshold value are equal and a content size value exceeds the second threshold value, the network switching means 61 switches a network to connect from the low speed network 4 to the high speed network 5 temporarily. Further, the mobile terminal 60 may be composed to include an acquisition reservation means of contents which, when a connection state with the high speed network 5 is out of the range after being changed by the network switching means 61, holds acquisition reservation information of contents including URL information of the external server 6. Further, the low speed network 4 is, for example, the third generation mobile telephone network such as the IMT-2000, and the high speed network 5 is, for example, a wireless LAN.

The mobile terminal 60 according to this exemplary embodiment acquires information representing a type and data capacity of the contents from the response of acquisition request of contents performed to the external server 6, and based on these information selects a communication method which performs data communication most suitably for the contents of an acquisition objective. For this reason, a special burden is not imposed on a user who operates the mobile terminal 60, and also improvement is made in the points of communication cost, communication speed and usability.

As stated above, communication terminals 1, 1a, a mobile phone 10 and a mobile terminal 60 according to each of the exemplary embodiments mentioned above change the bearer automatically according to the contents to be handled. Accordingly, a user can perform data communication using a bearer suitable for the contents to be handled without being conscious of changing a bearer.

Further, the present invention is not limited only to those exemplary embodiments mentioned above, and embodiments to which various changes are made without departing from the spirit and scope of the present invention are possible. The present invention can be applied to a communication terminal such as a personal computer and a PDA (Personal Digital Assistance) including a communication function capable of data communication by a plurality of communication methods.

Further, the present invention can be performed as a program that makes a communication terminal including a mobile phone execute the above-mentioned operation and as a recording medium that records it. That is, a communication terminal in the above-mentioned exemplary embodiment operates by such as a process, a means and a function executed on a computer by instructions of a program. An object of the present invention is also achieved by a computer (CPU) of a communication terminal by reading a program code of software which realizes the function of the above-mentioned exemplary embodiment from the computer-readable recording medium, that is, memory media, and by executing it. A program code can be read directly by a computer via a communication line and executed. As memory media, for example, a hard disk, an optical disc, a magnetolaser disk, a CD-ROM, a CD-R, a non-volatile memory card, a ROM and a magnetic tape or the like can be used.

Although the present invention has been described with reference to the exemplary embodiments above, the present invention is not limited to the above-mentioned exemplary embodiments. Various changes can be made in the composition and details of the present invention within the scope of the present invention and to the extent a person skilled in the art can understand.

AVAILABILITY IN INDUSTRY

As stated above, a communication terminal according to the present invention; and a communication method using the communication terminal, a program and a recording medium; can be applied to a communication terminal which can be connected with a plurality of types of networks; a communication method using the communication terminal, a program and a recording medium. In particular, they can be applied to a mobile phone connectable with the third generation mobile telephone network such as an IMT-2000 network and a wireless LAN; and a communication method using the mobile phone, a program and a recording medium.

What is claimed is:

1. A communication terminal which can be connected with a plurality of types of networks, the communication terminal comprising:
    a communication unit that transmits a transmission request of contents to an external server, and receives a response to said transmission request of contents from said external server;
    an extraction unit that extracts content information including a content type value and a content size value from a Hypertext Transfer Protocol (HTTP) header of said received response;
    a control unit that selects at least one network based on said extracted content type value and the extracted content size value, and makes said communication unit connect with said selected network; and
    a first memory that stores acquisition reservation information of contents corresponding to said transmission request of contents;
    wherein said control unit secures in said first memory as a reserved space a capacity of a file size confirmed from the extracted content size value in response to a case where said communication unit cannot connect with said selected network, and
    wherein said control unit makes said communication unit connect with said selected network and stores a content transmitted from said connected network in said reserved space of said first memory, in response to said communication unit turning to the state that can connect with the selected network.

2. The communication terminal according to claim 1, wherein said communication unit receives contents from said external server via said selected network; and
    said communication unit makes said control unit end said connection with said selected network in response to said receiving contents being completed.

3. The communication terminal according to claim 1, further comprising:
    a second memory that stores a first threshold value and a second threshold value, wherein
    said control unit makes said communication unit connect with said selected network, in response to said content type value being identical to said first threshold value and said content size value being larger than said second threshold value.

4. The communication terminal according to claim 1, wherein said plurality of types of networks comprise a mobile telephone network and a wireless Local Area Network (LAN); and
    in response to said wireless LAN being selected by said control unit based on said extracted content information while said communication unit is in the state of being connected with said mobile telephone network, said communication unit disconnects said connection with said mobile telephone network and connects with said wireless LAN.

5. The communication terminal according to claim 4, wherein said communication unit receives contents from said external server via said selected wireless LAN; and
    said communication unit ends a connection with said wireless LAN and connects with said mobile telephone network, in response to said receiving contents being completed.

6. A communication method using a communication terminal which can be connected with a plurality of types of network, the communication method comprising:
    transmitting to an external server a transmission request of contents;
    receiving from said external server a response to said transmission request of said contents;
    extracting content information including a content type value and a content size value from a Hypertext Transfer Protocol (HTTP) header of said received response;
    selecting at least one network based on said extracted content type value and the extracted content size value;
    connecting with said selected network;
    storing, in a first memory, acquisition reservation information of contents corresponding to said transmission request of contents;
    in response to a case where said selected network cannot be connected to, securing as a reserved space in said first memory a capacity of a file size confirmed from the extracted content size value; and
    in response to a case where said selected network can be connected to, connecting with said selected network and storing a content transmitted from said connected network in said reserved space of said first memory.

7. The communication method according to claim 6, further comprising:
    receiving contents from said external server via said selected network; and
    in response to said receiving contents being completed, ending a connection with said selected network.

8. The communication method according to claim 6, further comprising:
    connecting with said selected network, in response to said content type value being identical to a first threshold value and said content size value being larger than a second threshold value.

9. The communication method according to claim 6, wherein said plurality of types of networks comprises a mobile telephone network and a wireless Local Area Network (LAN); and
    the communication method further comprises:
        disconnecting said connection with said mobile telephone network and connecting with said wireless LAN, in response to said wireless LAN being selected based on said extracted content information while said communication terminal is in the state of being connected with said mobile telephone network.

10. The communication method according to claim 9, further comprising:
receiving contents from said external server via said selected wireless LAN; and
ending a connection with said selected wireless LAN and connecting with said mobile telephone network, in response to said receiving contents being completed.

11. A non-transitory computer-readable storage medium tangibly embodying a program of machine-readable instructions executable by a digital processing apparatus to perform an instruction control method that makes a computer control a communication terminal which can be connected with a plurality of types of networks, the instruction control method comprising:
transmitting a transmission request of contents to an external server;
receiving a response to said transmission request of said contents;
extracting content information including a content type value and a content size value from a Hypertext Transfer Protocol (HTTP) header of said received response;
selecting at least one network based on said extracted content type value and the extracted content size value; and
connecting with said selected network;
storing, in a first memory, acquisition reservation information of contents corresponding to said transmission request of contents;
in response to a case where said selected network cannot be connected to, securing as a reserved space in said first memory a capacity of a file size confirmed from the extracted content size value; and
in response to a case where said selected network can be connected to, connecting with said selected network and storing a content transmitted from said connected network in said reserved space of said first memory.

12. The non-transitory computer-readably storage medium according to claim 11, wherein the instruction control method further comprises:
receiving contents from said external server via said selected network; and
ending a connection with said selected network in response to a reception of said contents being completed.

* * * * *